(12) United States Patent
Rodriguez Machado et al.

(10) Patent No.: US 8,814,702 B2
(45) Date of Patent: Aug. 26, 2014

(54) METHOD FOR INTRODUCING A PHYSICAL OBJECT IN A VIRTUAL WORLD

(71) Applicant: Vodafone IP Licensing Limited, Newbury (GB)

(72) Inventors: Ruben Rodriguez Machado, Newbury (GB); Francisco Javier Rubio Andres, Newbury (GB); Unai Labirua Iturburu, Newbury (GB); Lucia Garate Mutiloa, Newbury (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 0 days.

(21) Appl. No.: 13/786,101

(22) Filed: Mar. 5, 2013

(65) Prior Publication Data

US 2013/0231191 A1    Sep. 5, 2013

(30) Foreign Application Priority Data

Mar. 5, 2012   (ES) .................................. 201230329

(51) Int. Cl.
*A63F 9/24*    (2006.01)
*A63F 13/12*   (2006.01)

(52) U.S. Cl.
CPC ...................................... *A63F 13/12* (2013.01)
USPC .................... 463/42; 463/29; 463/40; 463/36

(58) Field of Classification Search
None
See application file for complete search history.

(56) References Cited

U.S. PATENT DOCUMENTS

| | | | |
|---|---|---|---|
| 2007/0155506 A1* | 7/2007 | Malik | 463/42 |
| 2008/0268931 A1* | 10/2008 | Alderucci et al. | 463/11 |
| 2009/0005140 A1* | 1/2009 | Rose et al. | 463/7 |
| 2010/0062819 A1 | 3/2010 | Hannigan et al. | |
| 2010/0304804 A1* | 12/2010 | Spivack | 463/2 |
| 2011/0065496 A1 | 3/2011 | Gagner et al. | |
| 2011/0238473 A1 | 9/2011 | Sankolli et al. | |
| 2011/0244964 A1* | 10/2011 | Glynne-Jones et al. | 463/40 |

FOREIGN PATENT DOCUMENTS

| | | |
|---|---|---|
| EP | 2317720 A1 | 5/2011 |
| GB | 2478712 A | 9/2011 |
| JP | 2009011672 | 1/2009 |
| JP | 2009153724 | 7/2009 |

OTHER PUBLICATIONS

GB Search Report for GB1303872.4 dated Aug. 23, 2013.

* cited by examiner

*Primary Examiner* — James S McClellan
*Assistant Examiner* — Kevin Carter
(74) *Attorney, Agent, or Firm* — Workman Nydegger

(57) ABSTRACT

A method for introducing an object with a unique identifier in a video game. A request to a server to introduce the object is made. An identity of a user of the video game is sent to the server. The server generates a token paired with the identity, embeds the token in a multimedia file, and sends the multimedia file to the video console. The video console reproduces the multimedia file and shows a message to the user so that the user executes an application in a smartphone. The application activates a reader to obtain the unique identifier of the object and activates a sensor element to be able to extract said token associated with the multimedia file. The smartphone sends the unique identifier of the object and the token to the server. The server pairs the unique identifier of the object with the identity of the user by means of the token and sends the unique identifier of the object to the video console to introduce it in the video game.

10 Claims, 1 Drawing Sheet

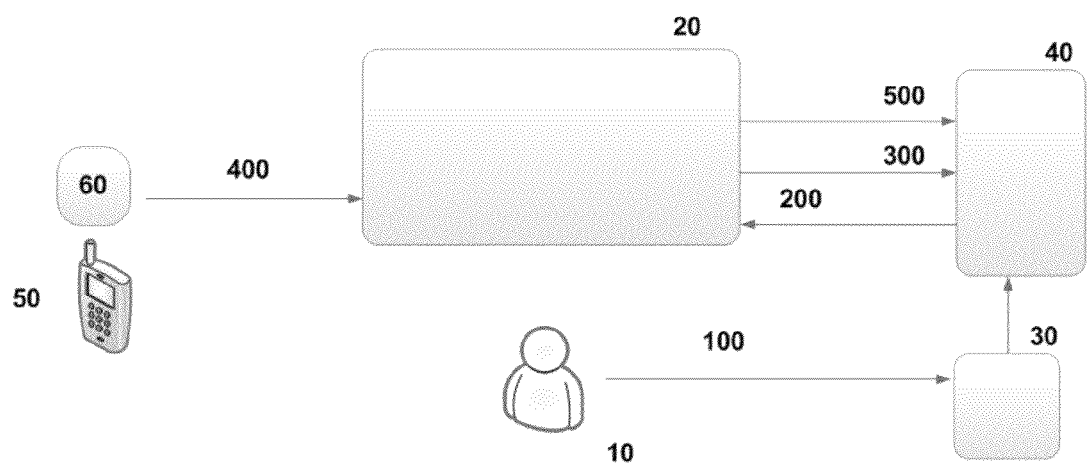

METHOD FOR INTRODUCING A PHYSICAL OBJECT IN A VIRTUAL WORLD

CROSS REFERENCE TO RELATED APPLICATIONS

This application claims priority to Spanish Application Number 201230329, filed on Mar. 5, 2012, the entirety of which is incorporated herein by reference.

FIELD OF THE INVENTION

The present invention has an application in the field of video games and virtual worlds.

BACKGROUND OF THE INVENTION

Today there are video games in which a physical object can be introduced in the virtual world of a video game. This physical object can have its own virtual avatar in the video game or provide a change in the virtual world in which it is introduced, such as for example, a new downloadable level, a kit for the user, change in user attributes, etc.

The reality is that there can be several physical objects, different video games and several players, each with its own identity. In fact, the activity of several players in virtual worlds requires the identification of the user for the purpose of managing the identity of the persons involved. To successfully introduce a physical object in a game, it is necessary to establish a unique and common link between the physical object to be introduced and the video game.

This link or unique bond can be established using the identity of the player as a unique and common reference. By providing that same identity of the player to the game and to the object, a direct link can be established to know in what game the information associated with the object should be introduced. However, this presents several problems:

- It is necessary for the user to assign a player identity to the object. This may not be possible because the user does not remember or does not know the player identity credentials.
- Even if the player identity credentials are known, the entity authorizing these credentials (for example, Playstation Network) is managed by a third party different from the entity that administers the object. Therefore, it may not be willing to confirm whether or not the credentials entered are valid.
- Different credential authorizing entities can manage different player identities. This is complex when validating player identities depending on of different authorizing entities.

In other words, solutions existing today require the intervention of a third party that is responsible for authenticating user credentials.

For example, to play a game online in Xbox® Live specific Xbox® Live authentication must be used in order to play online.

Another possibility would be to create a specific link directly with the console and authenticating the virtual world platform in the game with an SDK (Software Development Kit). The drawback in this case is that specific hardware is needed to connect to the virtual world platform and this implies a different interface for each type of virtual world platform (PC, tablet, PS3®, Xbox360, Wii®, etc.)

In the case of the PS Vita® console, the first time it is connected to PS3®, the user has to go through a pairing process consisting of generating a code which appears in user interface of the console and has to be entered in the PS Vita® user interface within a limited time period. In this case, all the elements belong to a closed system where all the elements are controlled by the same credentials authorizing entity (Sony in this case).

The game Skylanders (from Activision Solution) involves physical objects and video games. The solution includes a physical portal (an NFC reader) and the toys (physical objects) have the same NFC technology. Nevertheless, it is a local and closed solution that only works with the portal directly connected to the video console.

Therefore, the technical problem raised by the existing systems is that introducing an object in the video game is limited to authentication performed exclusively by authorizing entities. In other words, in order to pair up the object and the player identity, intervention of the credentials authorizing entity which controls player identities is necessary. The result of this is that an object provider unrelated to the credentials authorizing entity cannot validate the identity provided by the user since they are independent and unrelated entities.

DESCRIPTION OF THE INVENTION

The invention relates to a method for introducing an object in a video game according to claim 1. Preferred embodiments of the method are defined in the dependent claims.

The method of the present invention solves the problems raised by existing systems because:

- It is not necessary for the user to assign a player identity to an object.
- It is not necessary to additionally validate player identity credentials in an authorizing entity for pairing the object.
- The solution is independent of the authorizing entity on which the game depends.

In fact, the method proposed by the present invention allows associating a physical object with a virtual world by means of a server with no direct relationship with the credentials authorizing entity of the game.

Therefore, one aspect of the present invention relates to a method for introducing an object with a unique identifier in a video game, comprising the following steps:

- making a request to a server for introducing the object in said video game reproduced in a video console, sending an identity of a user of said video game to said server;
- said server generates a token paired with said identity of the user and embeds said token in a multimedia file and sends said multimedia file to the video console;
- the video console reproduces said multimedia file and shows a message to the user so that the user executes an application in a smartphone; said application:
    - activates a reader of said smartphone to obtain the unique identifier of said object;
    - activates a sensor element of the smartphone to be able to extract the token associated with said multimedia file reproduced by the video console;
- the smartphone sends the unique identifier of said object and the token to said server;
- the server pairs the unique identifier of the object with the identity of the user by means of said token and sends said unique identifier of the object to the video console to introduce said object in the video game.

In the present invention, the term token is understood as a unique temporal code.

Said token is preferably a chain of alphanumeric characters.

The reader of the smartphone can be an NFC or RFID reader, or it can also be a reader of graphically represented codes, such as, for example, QR, barcode, watermark image.

According to a first preferred embodiment of the invention, said sensor element of the smartphone is a multimedia capture device, and the application directly extracts the token from said multimedia file after this multimedia file is captured by the multimedia capture device of the smartphone.

According to this embodiment, the multimedia capture device of the smartphone can be a microphone when the multimedia file is an audio file, or it can be a camera when the multimedia file is an image file.

According to a second preferred embodiment of the invention, said multimedia file includes a series of instructions to carry out in the smartphone, these instructions being recognizable by the sensor element of the smartphone; according to this second embodiment, the application extracts the token by mapping out that series of instructions detected by the sensor element. Said sensor element can be a touch-sensitive interface; it can also be an accelerometer.

BRIEF DESCRIPTION OF THE DRAWINGS

To complement the description that is being made and for the purpose of aiding to better understand the features of the invention, a drawing is very briefly described below as an illustrative and non-limiting example thereof.

FIG. 1 shows the operation of the method proposed by the invention, and the main elements involved therein.

DESCRIPTION OF A PREFERRED EMBODIMENT OF THE INVENTION

FIG. 1 shows a user 10 with a video console 40 in which a video game 30 can be reproduced.

This user 10 starts a procedure in the video game for adding or introducing an object (step shown by arrow 100).

The video game 30 sends an identity of the user (step 200) to a server 20 through the video console 40.

The server 20 generates a token (or unique temporal code) which is paired with said identity of the user.

This token, which can be a chain of alphanumeric characters, is unique and can only be generated once during a specific time period. When this time period runs out, the tokens are recycled.

The server 20 incorporates this token in a tone or audio file by means of audio watermarking methods. The server 20 sends this audio file to the video console (step 300) where the video game reproduces it, the tone being audible through the speakers of the video console.

The video console also shows an on-screen message to the user indicating that he/she is to execute an application 60 previously installed in a smartphone 50.

This application 60 activates an NFC reader of said smartphone to thus obtain a unique identifier of the object to be introduced, which object in this case must be located in the proximity of the smartphone. This step of obtaining the unique identifier of the object can also be done by other methods, such as for example, by means of graphic codes, for example, BIDI.

On the other hand, the application 60 also activates the microphone of the mobile telephone for hearing the ambient sound, such that the tone reproduced in the video console is detected and thus the token is extracted.

This application 60 can be executed in any smartphone or intelligent mobile telephone belonging to any user.

It must be noted that until now it has been unnecessary to enter any type of credentials in the smartphone.

The smartphone 50 sends both the unique identifier of the object and the token (step 400) to the server 20.

The server 20 uses this token to establish the necessary pairing between the object and the identity of the player.

Finally, the server 20 sends the unique identifier of the object to the video console (step 500) so that it is introduced and added in the virtual world of the video game.

One difference with respect to existing pairing methods (as in the case of PS Vita®) is that it is virtually transparent for the user, who does not have to enter any credential.

When the user starts the process of adding an object for the video game, the video game reproduces a melody with a watermark. That melody or sound is captured by means of the application of the smartphone and is sent to a server to complete the pairing process.

According to another possible embodiment, the server 20 incorporates this token in a multimedia file by means of embedded coding in the same file (for example, audio and image watermarking and steganography methods). The server also sends this multimedia file to the video console, where the video game reproduces it, being reproduced by the video game platform, for example, through the screen and/or speakers of the video game platform.

In this embodiment, the video console also shows an on-screen message to the user or player indicating that he/she is to execute the application 60 previously installed in the smartphone 50.

The application 60 activates a reader of said smartphone to thus obtain the unique identifier of the object. This step of obtaining the unique identifier of the object can also be done by other methods, such as for example, by means of graphic codes.

According to this embodiment, the application activates a camera of the smartphone to extract the token from the multimedia file reproduced by the game platform.

According to another possible embodiment of the method of the invention, the multimedia file reproduced by the video console, for example, an image displayed on-screen, includes an instruction or series of instructions for the user to follow in the smartphone; for example, it may indicate making a series of strokes the touch-sensitive screen of the smartphone, or shaking the smartphone with a series of movements.

In this embodiment, the application activates the corresponding sensor of the corresponding smartphone, i.e., touch-sensitive screen or accelerometer/accelerometers, and after implementing that series of instructions with the corresponding activated sensor, the application maps out these instructions, thus obtaining the unique token.

The invention has been described according to preferred embodiments thereof, but for a person skilled in the art it will be evident that many variations can be introduced in said preferred embodiments without exceeding the object of the claimed invention.

The invention claimed is:

1. A method for introducing an object with a unique identifier in a video game, comprising the following steps:
   making a request to a server to introduce the object in said video game reproduced in a video console, sending an identity of a user of said video game to said server;
   said server generates a token paired with said identity and embeds said token in a multimedia file and sends said multimedia file to the video console;
   the video console reproduces said multimedia file and shows a message to the user so that the user executes an application in a smartphone; said application:

activates a reader of said smartphone to obtain the unique identifier of said object;

activates a sensor element of said smartphone to be able to extract said token associated with said multimedia file;

the smartphone sends the unique identifier of said object and the token to said server;

the server pairs the unique identifier of the object with the identity of the user by means of said token and sends said unique identifier of the object to the video console to introduce said object in the video game.

2. Method according to claim 1, wherein said reader of the smartphone is an NFC or RFID reader.

3. Method according to claim 1, wherein said reader of the smartphone is a reader of graphically represented codes.

4. Method according to claim 1, wherein said sensor element of the smartphone is a multimedia capture device and the application extracts the token from said multimedia file.

5. Method according to claim 4, wherein said multimedia capture device of the smartphone is a microphone and the multimedia file is an audio file.

6. Method according to claim 4, wherein said multimedia capture device of the smartphone is a camera and the multimedia file is an image file.

7. Method according to claim 1, wherein said multimedia file includes a series of instructions to carry out in the smartphone recognizable by the sensor element of the smartphone, and the application extracts the token by mapping out that series of instructions.

8. Method according to claim 7, wherein said sensor element is a touch sensitive interface.

9. Method according to claim 7, wherein said sensor element is an accelerometer.

10. Method according to claim 1, wherein said token is a chain of alphanumeric characters.

* * * * *